Oct. 8, 1957  E. H. GREPPIN  2,809,281
SURGICAL LIGHTING SYSTEM FOR TELEVISION AND OTHER CAMERAS
Filed Jan. 21, 1955  4 Sheets-Sheet 1
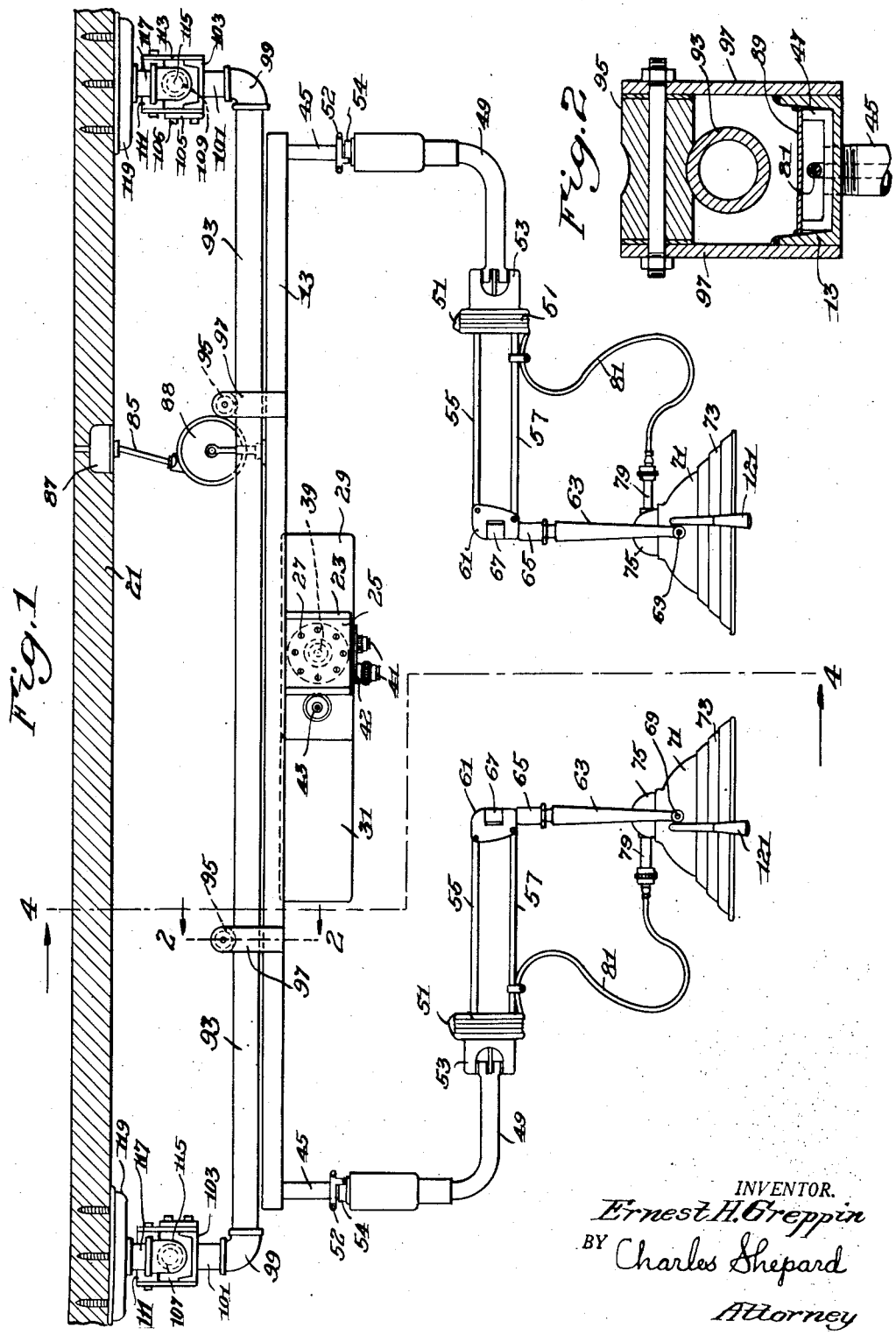
INVENTOR.
Ernest H. Greppin
BY Charles Shepard
Attorney

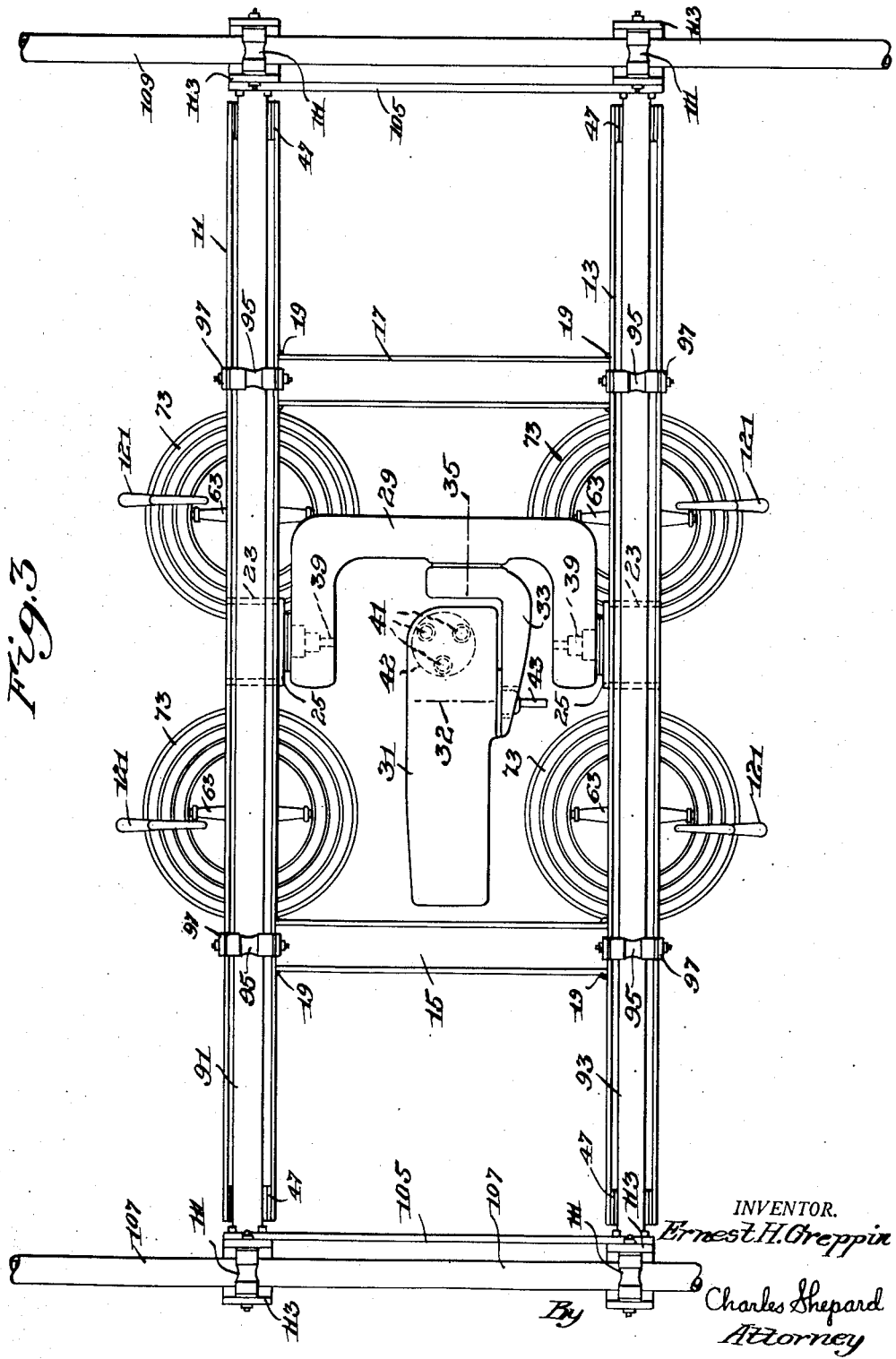

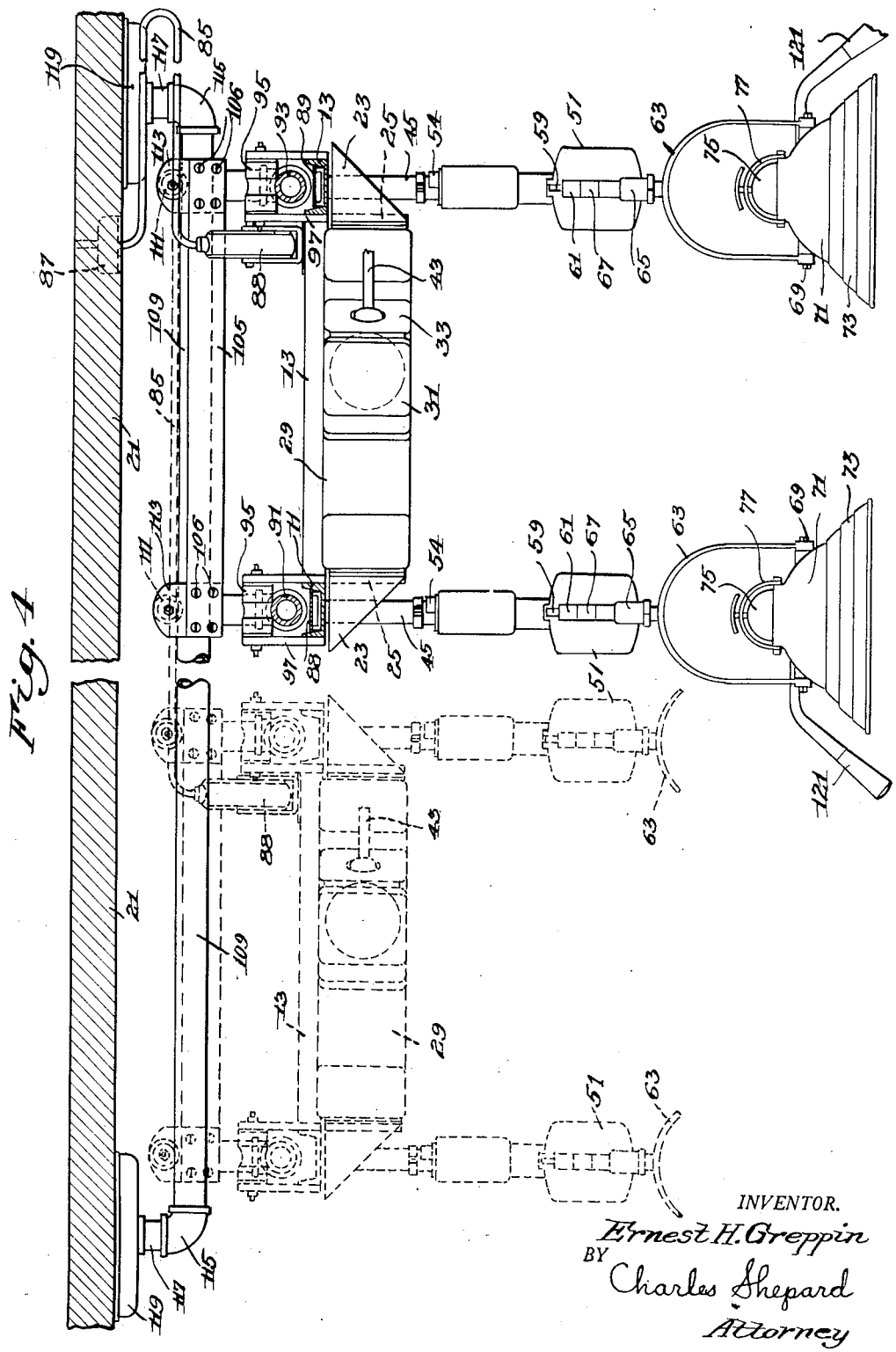

Oct. 8, 1957  E. H. GREPPIN  2,809,281
SURGICAL LIGHTING SYSTEM FOR TELEVISION AND OTHER CAMERAS
Filed Jan. 21, 1955  4 Sheets-Sheet 4

INVENTOR.
Ernest H. Greppin
BY Charles Shepard
Attorney

# United States Patent Office 2,809,281
Patented Oct. 8, 1957

2,809,281

SURGICAL LIGHTING SYSTEM FOR TELEVISION AND OTHER CAMERAS

Ernest H. Greppin, Brighton, N. Y., assignor to Wilmot Castle Company, Rochester, N. Y., a corporation of New York Application January 21, 1955, Serial No. 483,242

2 Claims. (Cl. 240—1.3)

The present invention relates partly to photography and optical projection, and partly to illuminating systems, and has for its broad object to provide a simple, easily operated, and efficient combined adjustable apparatus for jointly supporting a television camera or other type camera and a lighting arrangement for the camera that will be particularly adapted for use in the crowded and otherwise peculiar conditions existing within a surgical operating room when it is desired to televise or otherwise photograph the performance of a surgical operation.

Another object of the invention is to provide a joint support of this character in which the associated elements will be relatively compactly arranged, yet the camera will be protected from heat generated by the lighting units, either by sufficient spacing to avoid direct conduction of heat, or by the passage of cooling air currents induced by convection, or by both.

A further object is the provision of a combination of surgical illuminating means and a camera support, so arranged that in a simple and convenient manner the entire combination may be bodily shifted relative to the surgical operating table, and also each individual lighting unit may be adjusted relative to the other lighting units and to the camera support, the individual lighting units nevertheless having sufficient space to allow the camera to swing in the desired manner on its support.

These and other desirable objects may be attained in the manner disclosed as an illustrative embodiment of the invention in the following description and in the accompanying drawings forming a part hereof, in which:

Fig. 1 is a side elevation of the apparatus installed on an overhead structure;

Fig. 2 is a detail vertical section taken approximately on the line 2—2 of Fig. 1 showing the movable connection between an intermediate frame and the lighting unit and camera supporting frame or carriage;

Fig. 3 is a top plan of the apparatus shown in Fig. 1, with a portion of the overhead mounting shown in part;

Fig. 4 is a transverse vertical section taken approximately on the line 4—4 of Fig. 1 and showing, in broken lines, the lighting unit and camera supporting frame or carriage in a second adjusted position;

The same reference numerals throughout the several views indicate the same parts.

Figure 5:
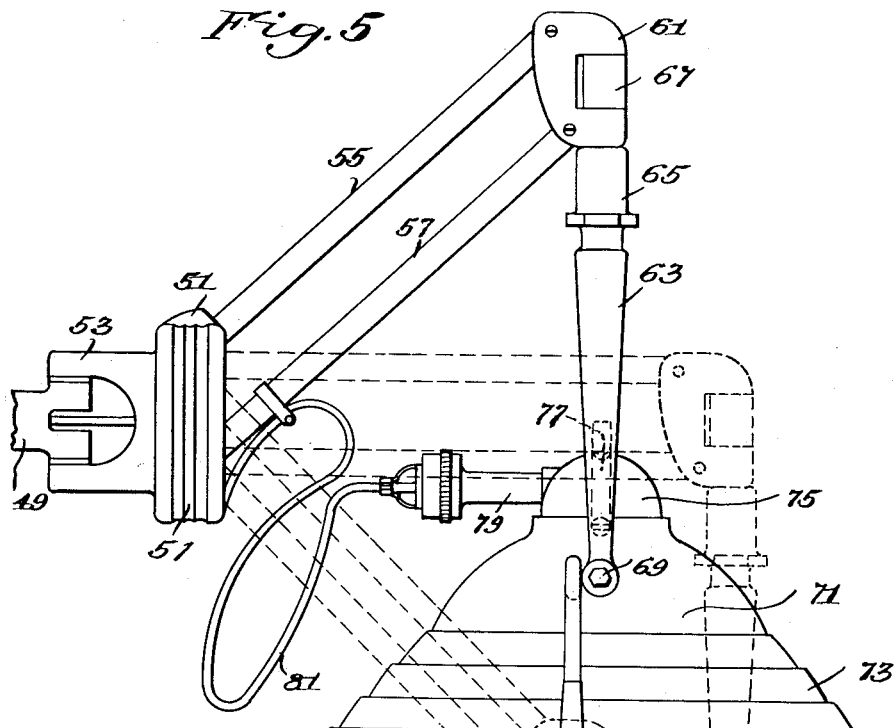
Fig. 5 is a side elevation of one of the lighting units and illustrating, by broken lines, its adjustability to various vertical positions.
Figure 6:
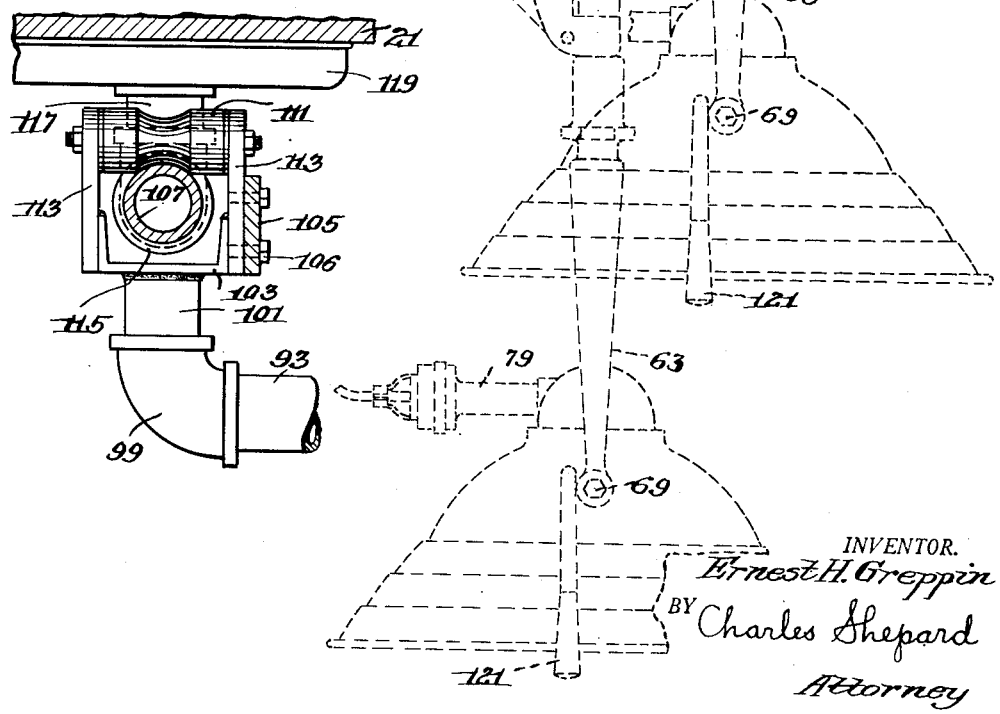
Fig. 6 is a fragmentary vertical section through a portion of the overhead mounting and the intermediate frame showing the movable connection therebetween.

In the preferred embodiment of the invention shown in the drawings, the lighting units and camera are supported by a horizontal primary frame or carriage formed of a pair of spaced approximately parallel side bars or rails 11 and 13 and a pair of cross bars or rails 15 and 17 which are disposed between the side bars 11 and 13 in spaced relationship relative to each other and the ends of the side bars and are secured thereto, as by welds 19. The side and cross bars are of channel section having their flanges extending vertically upward toward the ceiling structure shown at 21. To improve the appearance of this frame or carriage, a plate may be secured across each end of the side bars.

Fixed to the web of each of the side bars 11 and 13, approximately midway of their length, is a bracket 23 having a face plate 25 provided with a plurality of apertures 27 which receive suitable bolts for supporting a television camera yoke 29 therebetween. The television camera, indicated in general at 31, may be supported from the yoke 29 in any suitable manner known per se in the television art. For example, an angular bracket 33 may be mounted on the yoke 29 to rotate thereon about the axis of rotation indicated diagrammatically by the broken line 35, rotation being effected and controlled by any suitable motor. This bracket arm in turn carries the television camera 31, mounted for rotation relative to the bracket 33 on the rotary axis indicated diagrammatically by the broken line 32. This rotation also is effected and controlled by a suitable motor. The yoke 29 is also pivotally mounted on trunnions 39 and therefore movement of the camera 31, in a vertical plane approximately parallel to the side bars 11 and 13, may be effected by rotation of the camera about the axis shown at 32 or by rotation of the yoke 29 about the axis of the trunnions 39.

The camera 31 is provided with the usual television pick-up tube or camera tube, receiving its light selectively through one or another of the lenses or objectives 41 mounted on a turret 42 which can be rotated to bring any selected lens in line with the tube. A flexible electric cable 43 carries the electric circuit wires for all necessary functions of the television camera and its operating controls, including circuit wires for the electrical impulses corresponding to the scene viewed by the camera, as well as circuit wires for remote control of the motors which control rotation of the camera relative to the bracket 33 on the rotary axis 32, and rotation of the bracket 33 relative to the supporting yoke 29 on the rotary axis 35. By suitably operating these motors by remote control exercised through the cable 43, the camera may be "panned" relative to the primary frame or carriage; that is, it may be moved panoramically to alter the direction of viewing relative to the carriage.

Any number of surgical illuminating units or surgical lights may be carried by the carriage with four such units being shown in the preferred embodiment of the invention. The lighting units are connected to the carriage by means of vertical tubular rods 45 projecting downwardly from the end portions of the carriage side bars 11 and 13. As best seen in Fig. 2, the upper ends of the rods 45 pass through the webs of the side bars and are fixed to the webs of retaining and reinforcing channels 47 which are disposed between and engage with and may be welded to the flanges of the side bars 11 and 13. To the lower end of each of the rods 45 is rotatably mounted one end of a bent tubular support arm 49 having on its opposite end a hollow pivot block 51 which is adapted for movement in a horizontal plane to an extent as determined by the coacting stop members 52 and 54 fixed to rod 45 and arm 49, respectively. The swinging movement of the block 51 is facilitated by a vertical pivot pin passing through the arm 49 and the bifurcated portion 53 formed on the block 51. A pair of parallel links 55 and 57 are pivotally mounted at one end within the block 51, in a manner as more fully disclosed in my United States Patent 2,483,699, issued October 4, 1949, and extend outwardly therefrom through the vertical slot 59. As best seen in Fig. 5, the links 55 and 57 are of equal length and are pivotally secured at their opposite ends to a second pivot block 61 for parallelogrammatic movement in a vertical plane.

The surgical lighting unit is supported by a yoke 63 having an approximately central threaded extension which is secured to the pivot block 61 by nuts 65 and 67, the latter of which is disposed within a bifurcated portion on the block 61. The ends of the yoke 63 are provided with alined trunnions or pivots 69 which engage with the main body or bonnet 71 of the lighting unit to permit its oscillating movement about a horizontal axis. As more fully disclosed in my United States Patent 2,665,369, issued January 5, 1954, the preferred form of lighting unit includes a generally concave reflector 73 and an explosion-proof globe constructed as set forth in the above noted patent. At the rear end of the bonnet 71 is a removable cap 75 held in place by a pivotal bail 77 and provided with a gas-tight and explosion-proof conduit section 79 through which extend the electric current wires 81 of the bulb socket. Except for a short section of wiring which is unconfined so as to allow the individual lighting units to be swung on their trunnions 69, the major part of the electric wiring is run through and confined within the various tubular and channel supporting members as indicated in Fig. 1. The electric wiring is coiled on a spool arrangement 83 which automatically winds the wiring to prevent any undesired slack and from which connection is made to an electrical source by means of the extension 85 inserted into the ceiling socket 87. As seen in Fig. 2, a plate 89 is welded above the upper end of the rod 45 to prevent the electric wiring from interfering with the lateral travel of the apparatus.

It will be noted that the lens tubes 41 of the camera are located substantially at the optical center of the entire assembly thus far described; that is, substantially at the center of the primary frame or carriage, and at the center relative to the four illuminating units. The illuminating units are sufficiently close to each other to provide brilliant illumination over the desired operating area, yet they are adequately spaced far enough from each other laterally to allow free circulation of air around the illuminating units themselves and around the camera, which is important in keeping the camera sufficiently cool notwithstanding the relatively high heat generated by the powerful surgical illuminating units. A high degree of heat is detrimental to a television camera; hence it is of considerable advantage, in the preferred practice of the invention, to separate the illuminating units as shown, and to place them on an open or skeleton frame rather than mounting them within a casing or housing, so as to allow free circulation of cooling air around the camera itself.

The camera and lighting unit primary frame or carriage is suspended from and movable along a pair of spaced tubular rails 91 and 93 by means of a plurality of grooved rollers 95, each of which is rotatably mounted between a pair of strap members 97 secured to the flanges of the side bars 11 and 13, as seen in Figs. 1 to 4. The ends of each of the rails 91 and 93 are connected by a suitable elbow 99 and vertical extension 101 to a short channel section 103 disposed in an approximately horizontal position with its flanges extending upwardly. As seen in Fig. 3, a spacer bar 105 is secured, as by bolts 106, to the adjacent channel sections 103 at each end of the rails 91 and 93 for maintaining the rails correctly spaced and forming with the rails 91 and 93 an intermediate frame. The intermediate frame is suspended from a pair of spaced tracks 107 and 109 for lateral travel (see Fig. 4) by means of grooved rollers 111 engaging the upper portions of the tracks and rotatably mounted between a pair of straps 113 secured to the flanges of each of the channel sections 103. The tracks 107 and 109 are disposed at approximately right angles to the plane of the rails 91 and 93 and are provided at each end with an elbow 115, a vertical extension 117, and a mounting plate 119 which facilitate the attachment of the tracks 107 and 109 to the ceiling structure 21 in spaced relationship thereto.

With this arrangement, it is seen that there is complete capability of adjustment in any manner normally needed in a surgical operating room. The intermediate frame, along with the carriage suspended therefrom, may be moved along the tracks 107 and 109 in a direction transverse to the operating table (see Fig. 1). In addition the entire carriage supporting the camera and illuminating units may be moved bodily along the rails 91 and 93 in a direction parallel to the length of the operating table. In this way, the unit as a whole may be brought directly over the patient on the operating table.

Whenever the surgeon prefers to have the light concentrated on one particular area of the patient, the individual illuminating units may be swung horizontally either on the rod 45 or pivot block 51, or both to locate the unit as near as possible to the desired location. The individual lamp may further be adjusted as desired by tilting it individually on its own trunnions 69 by means of the arm or handle 121. The trunnions 69 of each lamp extend substantially through the center of gravity of the lamp and therefore the slight friction in each of the trunnions permits the lamp to remain in adjusted position until purposely shifted to another position. The location of the lamps, their adjustability, and the rather large diameter of each reflector 73 permits the light from each individual lamp to approach any particular point on the patient's body from a number of different directions, thus tending to eliminate shadows caused by the operating instruments or the surgeon's hands, and giving what is called shadowless illumination. In addition to the shadowless effect produced by each of these operating lamps, the combined result of the several lamps spaced from each other gives an even greater shadowless effect, so that the net result produced is a type of illumination particularly beneficial for surgical operations and especially beneficial for photographing surgical operaitons by means of a television camera, because shadows are eliminated for all practical purposes and those who are observing the televised operation will see clearly all pertinent details thereof with illumination of approximately even brilliance and without the loss of details which would be occasioned by shadows.

These beneficial results are attained, as already mentioned, without causing any overheating of the television camera due to the amount of heat generated by the illuminating lamps, and without interfering in any way with the ability of the television camera operator to "pan" the camera (by his remote control motors) during the progress of the operation, as may seem desirable from time to time.

It will be understood, of course, that surgical operations are ordinarily not intended to be broadcast to the general public, but it is frequently desirable to televise them for observation by a selected audience of other doctors, who thus are able to observe the operation, through the eyes of the television camera, from a closer and better location and in greater detail than would be possible if the observing doctors or students were actually present in the usual clinical amphitheatre. However, the place to which the television impulses are conveyed or the manner in which they are employed is immaterial so far as the present invention is concerned.

This application is a continuation in part of applicant's copending application Serial No. 392,356, filed November 16, 1953, which has become Patent 2,758,196, granted August 7, 1956.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A combined surgical lighting unit and camera supporting structure for suspension from the ceiling of a surgical operating room, comprising a pair of horizontal rails supported in stationary position from the ceiling and arranged parallel to and laterally spaced from each other, a pair of cross bars secured to each other in parallel and laterally spaced relation to form an intermediate carriage, roller means secured to the ends of said cross bars and riding on said horizontal rails to support said intermediate carriage from said rails for bodily movement along said rails, said cross bars of said carriage extending horizontally substantially perpendicular to the direction of said rails, an open skeleton frame mounted below said carriage and having an approximately rectangular outline in horizontal plan, roller means secured to said skeleton frame and riding on said cross bars of said carriage to support said frame from said carriage for movement in a direction along the cross bars of said carriage and approximately perpendicular to the direction of said horizontal rails, a camera support secured to said skeleton frame for holding a camera in a position approximately centrally of said frame to point downwardly toward a surgical operating table beneath said frame, four depending hanger means, one secured to and depending from each of the four corners of said rectangular frame, each of said hanger means including a vertical arm fixed to and extending downwardly from said skeleton frame and a horizontal arm supported from and swingable horizontally around said vertical arm, a bracket pivotally mounted on said horizontal arm of each of said hanger means for horizontal swinging movement thereon and also for upward and downward swinging movement, a yoke depending from the free end of each bracket, and a lamp pivotally mounted in each yoke for tilting adjusting movement relative thereto, whereby the field of view of a camera held by said camera support may be illuminated by the lamps mounted in said yokes and the lamps may be adjusted relative to said field of view by tilting each lamp in its yoke, by swinging the yoke supporting bracket upwardly and downwardly to vary the distance of each lamp from the operating table, by swinging the yoke supporting bracket horizontally relative to the horizontal arm on which it is mounted and by swinging such horizontal arm relative to the vertical arm from which it is supported to vary the horizontal position of each lamp individually relative to the operating table, and by rolling said skeleton frame along said carriage and by rolling said carriage along said rails to produce simultaneous adjustment of the positions of all four lamps and said camera support relative to the operating table.

2. A construction as defined in claim 1, further including an adjusting handle depending from each of said lamps, each adjusting handle normally being within manual reach of a person standing on a floor beneath said skeleton frame.

References Cited in the file of this patent

UNITED STATES PATENTS

| | | |
|---|---|---|
| D. 120,510 | Kinze | May 14, 1940 |
| 837,084 | Von Der Lippe | Nov. 27, 1906 |
| 1,514,069 | Rothe | Nov. 4, 1924 |
| 2,114,664 | Gelb | Apr. 19, 1938 |
| 2,551,753 | McCullough | May 8, 1951 |
| 2,675,462 | Newton | Apr. 13, 1954 |
| 2,758,196 | Greppin | Aug. 7, 1956 |

FOREIGN PATENTS

| | | |
|---|---|---|
| 608,016 | France | Apr. 10, 1916 |